(12) United States Patent
Zu

(10) Patent No.: US 7,869,835 B1
(45) Date of Patent: Jan. 11, 2011

(54) METHOD AND SYSTEM FOR PRE-LOADING AND EXECUTING COMPUTER INSTRUCTIONS WITHIN THE CACHE MEMORY

(75) Inventor: Peter Z. Zu, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1517 days.

(21) Appl. No.: 11/071,658

(22) Filed: Mar. 2, 2005

(51) Int. Cl.
*H04B 1/38* (2006.01)
*H04M 1/00* (2006.01)
*G06F 12/08* (2006.01)

(52) U.S. Cl. ............. 455/574; 455/127.5; 455/343.4; 455/343.5; 711/118

(58) Field of Classification Search ........... 455/574, 455/343.1, 343.2, 343.5, 522, 127.1, 127.5, 455/343.4, 343.3; 370/311, 338; 711/143, 711/123, 163, 118; 713/324
See application file for complete search history.

(56) References Cited

U.S. PATENT DOCUMENTS

| | | | |
|---|---|---|---|
| 6,978,149 B1 * | 12/2005 | Morelli et al. | 455/522 |
| 7,321,787 B2 * | 1/2008 | Kim | 455/574 |
| 7,369,815 B2 * | 5/2008 | Kang et al. | 455/73 |
| 7,412,570 B2 * | 8/2008 | Moll et al. | 711/147 |
| 2003/0003943 A1 * | 1/2003 | Bajikar | 455/550 |
| 2004/0103253 A1 * | 5/2004 | Kamei et al. | 711/143 |
| 2005/0239518 A1 * | 10/2005 | D'Agostino et al. | 455/574 |

* cited by examiner

*Primary Examiner*—Pablo N Tran

(57) ABSTRACT

Embodiments of the present invention recite a method and system for pre-loading and executing code within the cache. In one embodiment, an indication to operate an electronic device in a sleep state is received. At least one instance of code is loaded into a cache memory in response to receiving the indication. The at least one instance of code is for causing the electronic device to operate in said sleep state. In embodiments of the present invention, the at least one instance of code further comprises a registry setting for a memory controller. The at least one instance of code is then accessed from the cache memory.

24 Claims, 6 Drawing Sheets

100

420 FIGURE 6
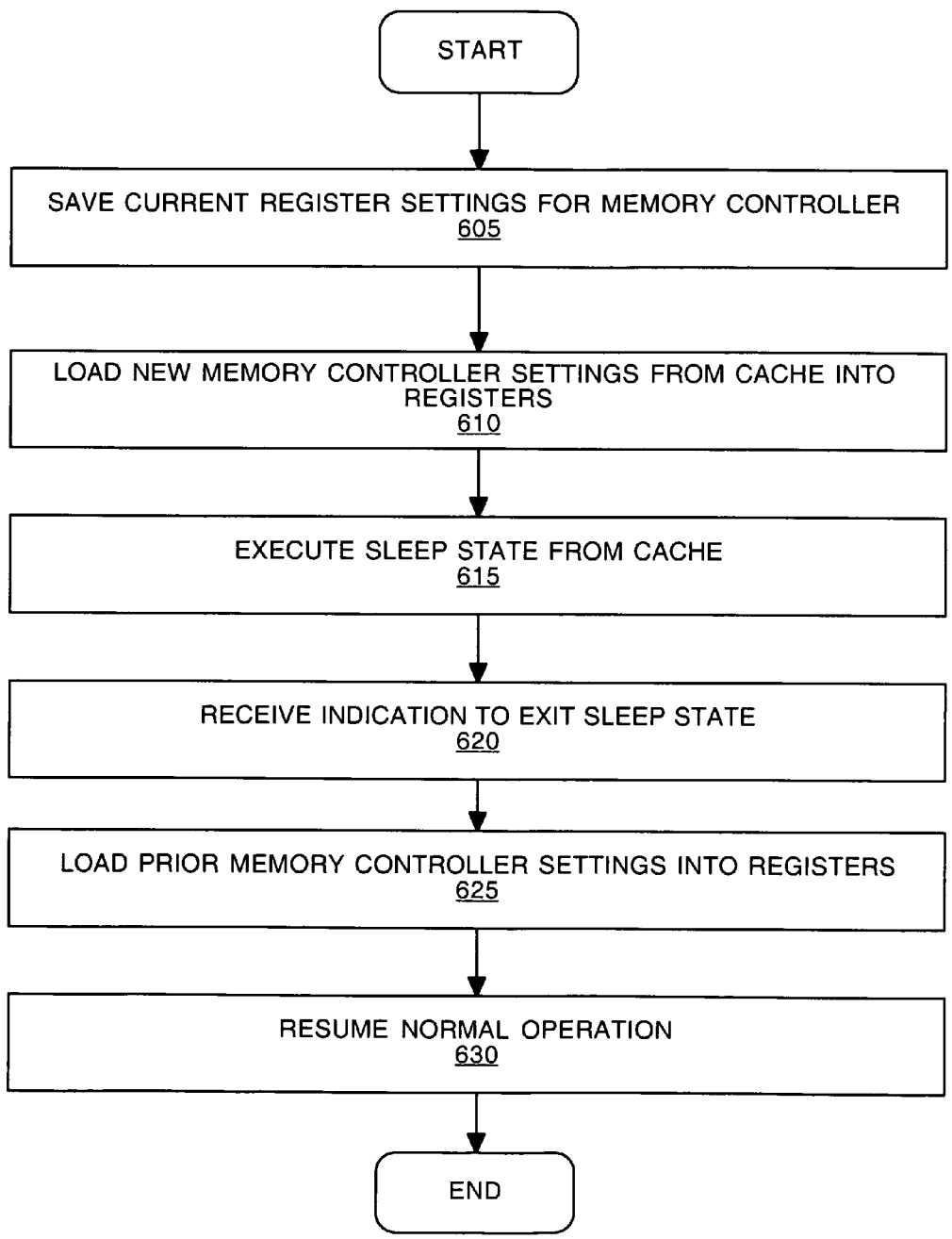

METHOD AND SYSTEM FOR PRE-LOADING AND EXECUTING COMPUTER INSTRUCTIONS WITHIN THE CACHE MEMORY

FIELD OF THE INVENTION

Embodiments of the present invention are related to the field of power conservation in electronic devices.

BACKGROUND OF THE INVENTION

Many electronic devices (e.g., personal computers, laptop computers, personal digital assistants (PDAs), cellular telephone, etc.) implement a sleep state to reduce energy consumption. This is especially important for portable devices in order to extend the battery life of the device. In a typical sleep state power supply to components such as the processor, memory controller, memory, and other components is reduced.

In order to maintain data integrity in the memory, a data refresh operation is periodically performed. Typically, during normal operation of the device, data refresh is managed by the memory controller. However, when the device goes into stand-by mode, also known as a "sleep state," data refresh may, in some devices, be managed by the memory component itself called self refresh.

Prior to entering sleep state, the register values for some memory controllers may need to be modified to allow the memory component to perform self refresh. In an exemplary sequence of events, the settings of memory controller for system normal running environment are stored, registers of the memory controller are re-programmed so that the memory controller can drive the memory to self refresh mode under the sleep state, and the stand-by command is generated to the stand-by control register. However, the register values for re-programming the memory controller, as well as the stand-by command to actually implement the sleep state are typically stored in the memory. Thus, once the register settings for the memory controller have been re-programmed, in certain computer system designs the data in memory is no longer accessible or may not be reliably accessed. As a result, re-programming the memory controller and generating the stand-by command cannot be accomplished because the data controlling these operations cannot be accessed from memory.

SUMMARY OF THE INVENTION

Accordingly, it would be advantageous to be able to access data for restoring a memory controller when the main memory is not accessible. While meeting the above stated need, it would also be advantageous to be able to save the register settings for a memory controller when entering a sleep state and restoring those settings when exiting the sleep state while not relying on main memory.

Embodiments of the present invention recite a method and system for pre-loading and executing code within a cache memory. In one embodiment, an indication to operate an electronic device in a reduced power state (e.g., a sleep or stand-by state) is received. At least one instance of code is loaded into a cache memory in response to receiving the indication. The at least one instance of code is for causing the electronic device to operate in said sleep state. In embodiments of the present invention, the at least one instance of code further comprises a registry setting for a memory controller. The at least one instance of code is then accessed from the cache memory.

BRIEF DESCRIPTION OF THE DRAWINGS

The accompanying drawings, which are incorporated in and form a part of this specification, illustrate embodiments of the present invention and, together with the description, serve to explain the principles of the invention. Unless specifically noted, the drawings referred to in this description should be understood as not being drawn to scale.

FIG. 6 is a flowchart of executing exemplary pre-loaded instructions from cache memory in accordance with embodiments of the present invention.

DETAILED DESCRIPTION OF THE PREFERRED EMBODIMENT

Reference will now be made in detail to embodiments of the present invention, examples of which are illustrated in the accompanying drawings. While the present invention will be described in conjunction with the following embodiments, it will be understood that they are not intended to limit the present invention to these embodiments alone. On the contrary, the present invention is intended to cover alternatives, modifications, and equivalents which may be included within the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

Notation and Nomenclature

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signal capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "receiving," "loading," "accessing," "sending," "saving," "configuring," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
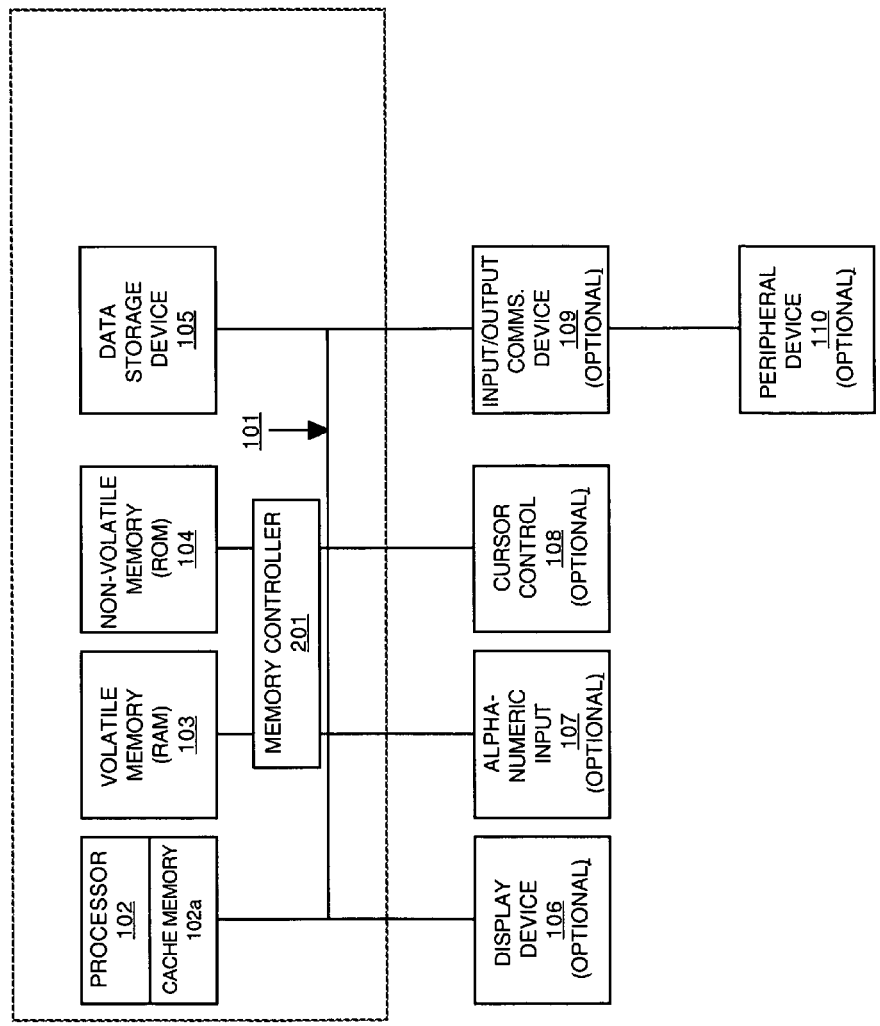
FIG. 1 is a block diagram of an exemplary computer system upon which embodiments of the present invention may be implemented.

With reference to FIG. 1, portions of the present invention are comprised of computer-readable and computer-executable instructions that reside, for example, in computer system 100 which is used as a part of a general purpose computer network (not shown). It is appreciated that computer system 100 of FIG. 1 is exemplary only and that the present invention can operate within a number of different computer systems including general-purpose computer systems, embedded computer systems, laptop computer systems, hand-held computer systems, and stand-alone computer systems, or other electronic devices such as cellular telephones.

In the present embodiment, computer system 100 includes an address/data bus 101 for conveying digital information between the various components and a central processor unit (CPU) 102 for processing the digital information and instructions. In the embodiment of FIG. 1, processor 102 further comprises a cache memory 102a for storing frequently accessed instructions. Computer system 100 also includes a volatile main memory 103 comprised of volatile random access memory (RAM) for storing the digital information and instructions, and a non-volatile read only memory (ROM) 104 for storing information and instructions of a more permanent nature. In embodiments of the present invention, a memory controller 201 coordinates memory access for processor 102. In addition, computer system 100 may also include a data storage device 105 (e.g., a magnetic, optical, floppy, or tape drive or the like) for storing vast amounts of data. It should be noted that the software program for performing pre-loading and executing code within the cache of the present invention can be stored either in volatile memory 103, data storage device 105, or in an external storage device (not shown).

Devices which are optionally coupled to computer system 100 include a display device 106 for displaying information to a computer user, an alpha-numeric input device 107 (e.g., a keyboard), and a cursor control device 108 (e.g., mouse, trackball, light pen, etc.) for inputting data, selections, updates, etc. Computer system 100 can also include a mechanism for emitting an audible signal (not shown).

Returning still to FIG. 1, optional display device 106 of FIG. 1 may be a liquid crystal device, cathode ray tube, or other display device suitable for creating graphic images and alpha-numeric characters recognizable to a user. Optional cursor control device 108 allows the computer user to dynamically signal the two dimensional movement of a visible symbol (cursor) on a display screen of display device 106.

Furthermore, computer system 100 can include an optional input/output (I/O) signal unit (e.g., interface) 109 for interfacing with a peripheral device 110 (e.g., a computer network, modem, mass storage device, etc.). Accordingly, computer system 100 may be coupled in a network, such as a client/ server environment, whereby a number of clients (e.g., personal computers, workstations, portable computers, minicomputers, terminals, etc.) are used to run processes for performing desired tasks. In particular, computer system 100 can be coupled in a system for code pre-loading and executing within the cache.

Figure 2:
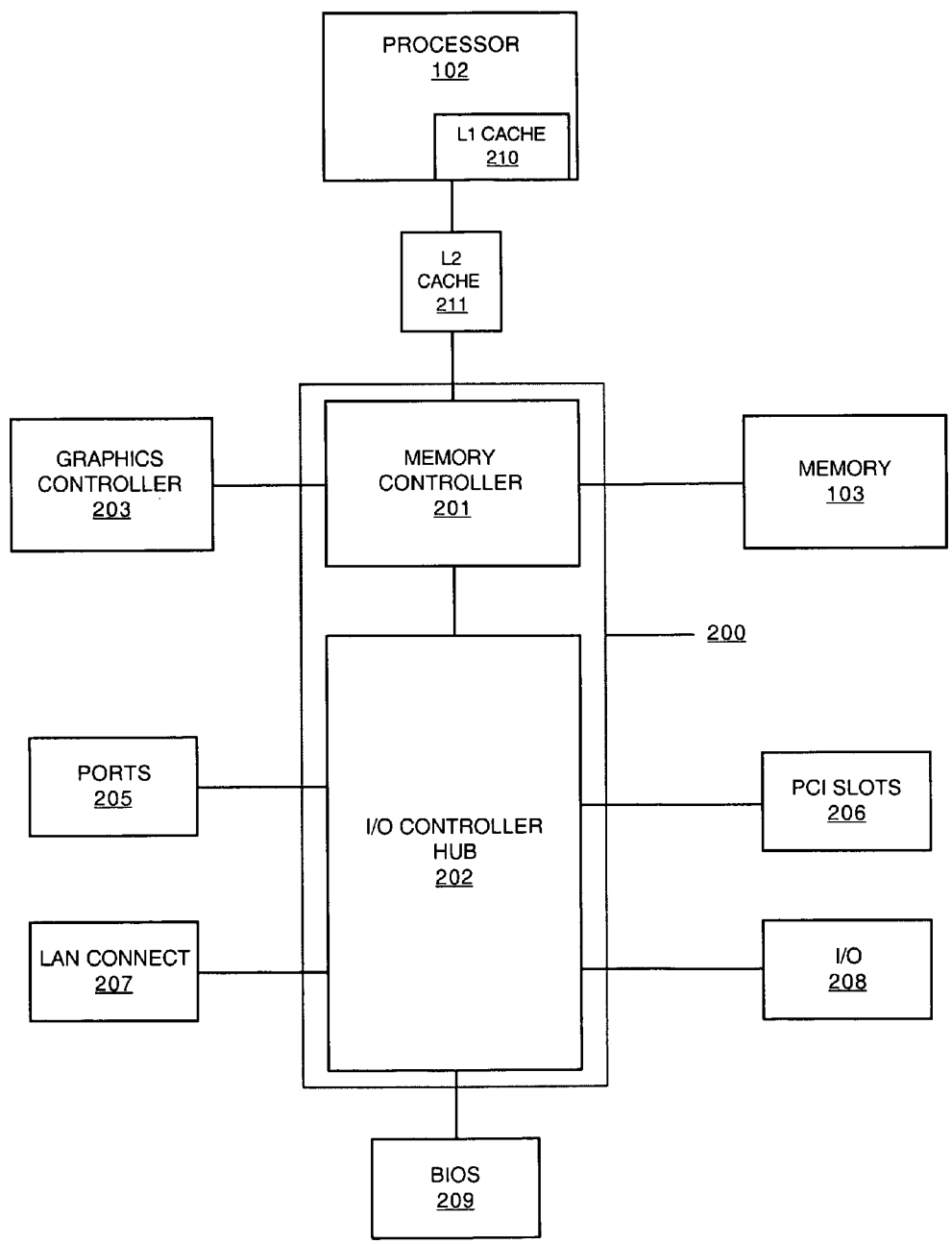
FIG. 2 shows an exemplary chipset configuration in accordance with embodiments of the present invention.

FIG. 2 is a block diagram of an exemplary chipset configuration of computer system 100 in accordance with embodiments of the present invention. In FIG. 2, processor 102 is coupled with a chipset 200 comprising a memory controller 201, which synchronizes access to memory, coupled with an input/output controller (I/O controller) 202. Memory controller 201 is further coupled with graphics controller 203 and memory 103 of FIG. 1. I/O controller hub 202 couples various I/O devices with processor 102, and memory controller 201. For example universal serial bus (USB) ports 205 and peripheral component interface (PCI) slots 206 are accessed by processor 102 via I/O controller hub 202. Various I/O devices (e.g., alpha-numeric input 107 and cursor control 108 of FIG. 1) are also coupled with I/O controller hub 202 as well as system BIOS 209 and local area network (LAN) connection 207. In the embodiment of FIG. 2, processor 102 further comprises an L1 cache 210 for storing frequently accessed data. An L2 cache 211 is shown disposed between memory controller 201 and processor 102. While FIG. 2 shows this configuration of L2 cache 211 it is noted that L2 cache 211 may be disposed within processor 102 in a manner similar to that of L2 cache 211 of FIG. 4.

Figure 3:
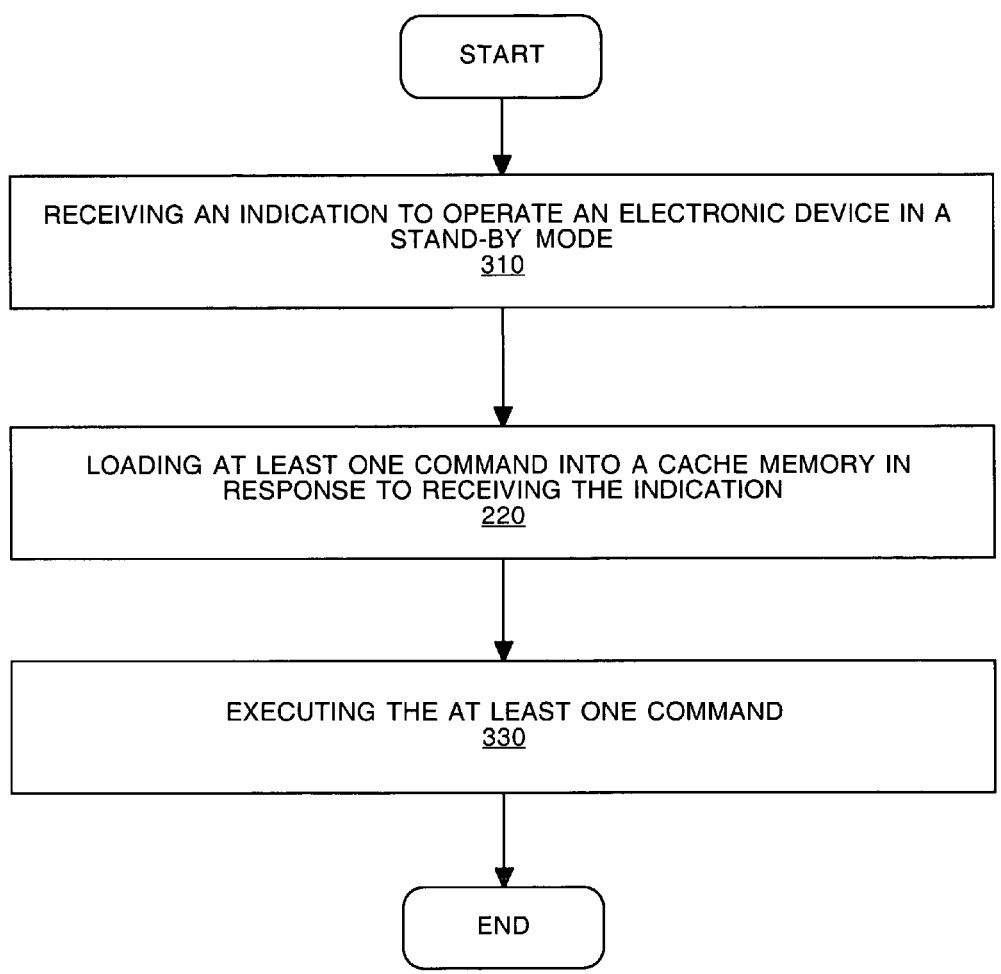
FIG. 3 is a flowchart of a method for pre-loading and executing instructions from cache memory in accordance with embodiments of the present invention

FIG. 3 is a flowchart of a method 300 for pre-loading and executing instructions from cache memory in accordance with embodiments of the present invention. In step 310, an indication is received to operate an electronic device in a reduced power (e.g., a sleep or stand-by) state. Typically, computers enter these states as a method to conserve power in response to a user command or as a result of a time-out of the system inactivity timer. In embodiments of the present invention, a sleep state command, typically referred to as an "Sx" command (e.g., S1 state or S3 state) is generated to an Advanced Configuration and Power Interface (ACPI). The ACPI specification defines an operating system directed motherboard device configuration and power management interface which defines a variety of sleep states for an electronic device. Thus, the operating system directs system and device power state transitions.

In the ACPI specification, each sleep state further defines the power status of a variety of devices (e.g., the processor, hard drives, system clock, and data storage) in the electronic device. Typically, an SMI (System Management Interrupt) is sent to the processor which immediately goes into System Management Mode (SMM) wherein various peripheral devices are shut down while data is maintained (e.g., stored in RAM 103, registers, and/or cache memory). Thus, the computer system is in a low power consumption state, but can quickly restore previously running settings when use of the computer is resumed.

Figure 4:
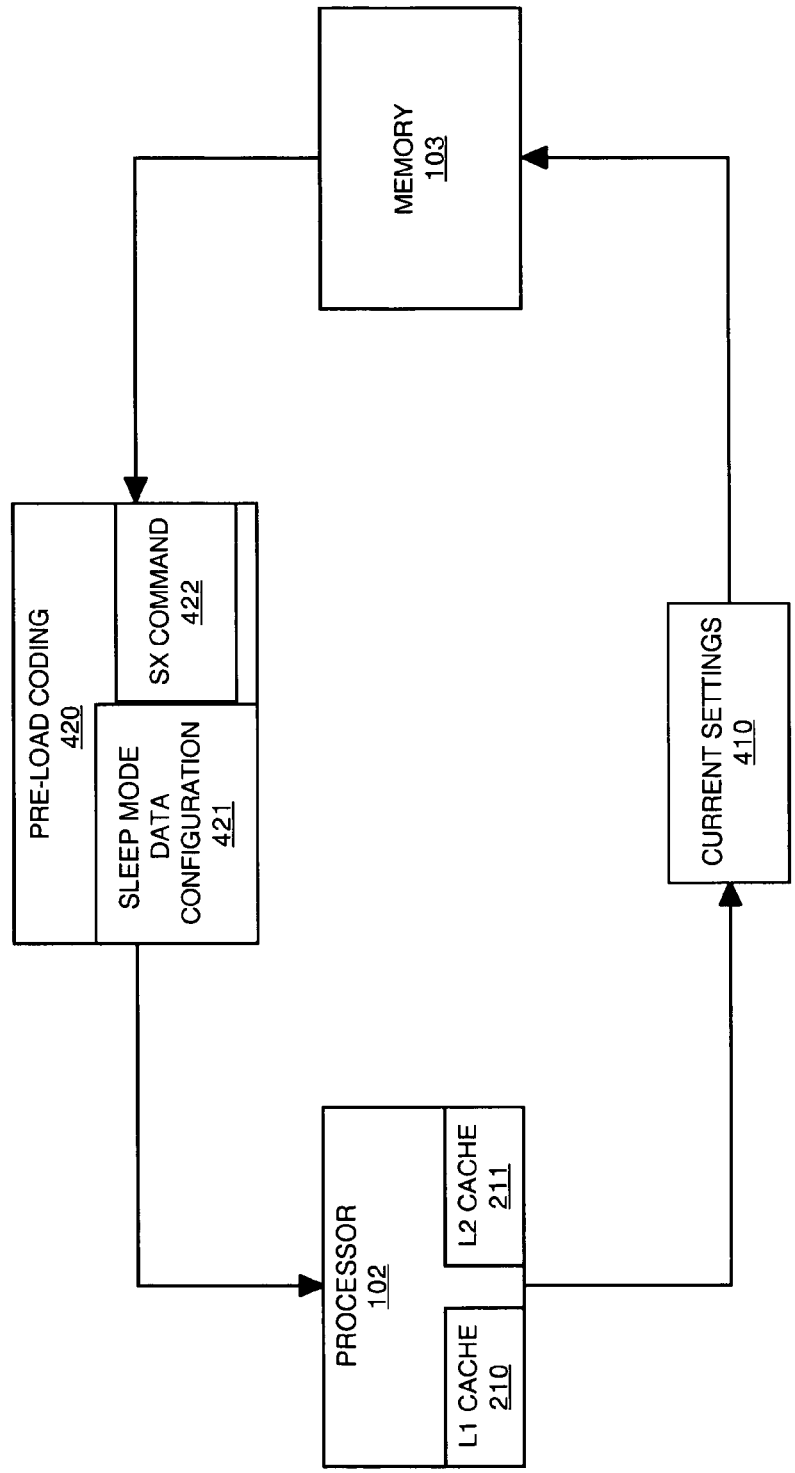
FIG. 4 shows the transfer of current settings and pre-load instructions in accordance with embodiments of the present invention.

As stated above, during normal operation of computer system 100, data refresh of data stored in RAM 103 is managed by memory controller 201. However, when computer system 100 enters one or more sleep states, RAM 103 may enter a self-refresh mode and data refresh in no longer managed by memory controller 201, but is instead performed by the memory component itself. Referring now to FIG. 4, in embodiments of the present invention, prior to sending the Sx command to the ACPI controller, the register settings which control memory controller 201 during normal operations (e.g., current settings 410 of FIG. 4) are saved (e.g., to memory 103, to L1 cache 210, or to L2 cache 211) in response to receiving the indication to operate in sleep state. Furthermore, in embodiments of the present invention, cache space is enabled for the system management interrupt (SMI) space, if it has not been previously enabled.

In step 320, at least one instance of pre-load code (e.g., pre-load coding 420 of FIG. 4) is loaded into a cache memory of the electronic device in response to the indication. In embodiments of the present invention, pre-load code 420 comprises sleep mode configuration data 421 for re-programming memory controller 201. More specifically, sleep mode configuration data 421 is loaded into cache memory (e.g., L1 cache 210 or L2 cache 211) and comprises register settings which regulate memory controller 201 prior to entering the sleep state.

In embodiments of the present invention, pre-load code 420 also comprises an Sx command for causing an electronic device (e.g., computer system 100 of FIG. 1) to enter a sleep state. While the present embodiment specifically recites causing a computer system to enter a sleep state, it is noted that embodiments of the present invention are well suited for use in other electronic devices such as cell phones, Personal Digital Assistants (PDAs), laptop computers, etc., where power conservation is an issue.

As described above, the register settings for the memory controllers of some electronic devices are modified prior to entering sleep state to allow memory self refresh. However, once the register settings are modified, accessing memory 103 may not be reliable or may not be possible at all. As a result, the data for causing the system to enter the sleep state (e.g., Sx command 422 and/or sleep mode configuration data 421) may not be accessed from main memory after the register settings for the memory controller have been changed. In embodiments of the present invention, pre-loading the register settings for memory controller 201 (e.g., sleep mode configuration data 421 of FIG. 4) and the Sx command (e.g., 422 of FIG. 4) for the ACPI controller to cache facilitates reliably accessing this data after the register settings for memory controller 201 have been re-programmed.

In step 330, the pre-loaded code is accessed from cache memory and executed. In embodiments of the present invention, once the register settings for memory controller 201 and the Sx command have been loaded into cache memory (e.g., L1 cache 210 or L2 cache 211), the register settings are accessed from cache and memory controller 201 is re-programmed for sleep mode configuration. In embodiments of the present invention, Sx command 422 is also accessed from cache memory and sent to the ACPI.

In embodiments of the present invention, pre-load code 420 also includes an instruction to retrieve instructions from cache memory which facilitate terminating the sleep state and returning to the normal operation state for the electronic device. In embodiments of the present invention, this includes retrieving the register settings for memory controller 201 (e.g., 410 of FIG. 4) which were saved to memory 103 or cache memory prior to entering the sleep state. In embodiments of the present invention the previous cache attribute for the SMI space is also restored.

In embodiments of the present invention, pre-load code 420 is not loaded into cache until the sleep state is initiated. In embodiments of the present invention, a pre-load flag (e.g., indicating if the pre-load code 420 is present in cache memory) may be stored in cache memory (e.g., L1 cache 210, or L2 cache 211), or as a register value. In one embodiment, the pre-load flag setting of false (e.g., during normal operation) indicates that pre-load code 420 has not yet been written into cache. When the sleep state is initiated, the pre-load flag is checked to determine if pre-load code 420 has been written to cache (e.g., L1 cache 210 or L2 cache 211). If the pre-load flag is set to false, processor 102 initiates loading pre-load code 420 from memory into cache (e.g., L2 cache 211). After pre-load code 420 is loaded into cache memory, the pre-load flag is set to true. At this point, processor 102 and execute the pre-load code from cache.

In embodiments of the present invention, it is important that the functions loaded into cache do not overrun the cache line size of the cache or overrun the overall size of the cache. For example, a typical L1 cache has a cache line size of 64 bits while a typical L2 cache has a cache line size of 128 bits. Therefore in embodiments of the present invention, the data of pre-load code 420 is configured so as not to overrun the cache line size of the cache to which it is written. The following pseudo-code shows one embodiment for loading pre-load code 420 into cache in accordance with embodiments of the present invention.

(T.0)=>a.1=>a.n (T.1)=>b.1=>b.n (T.2)=>c.1=>c.n (T.n)

In the above pseudo-code, a.1=>a.n represents a portion of pre-load code 420 that is written to one line of cache (e.g., L2 cache 211). Similarly, b.1=>b.n represents a second portion of pre-load code 420 that is written to a second line of cache, etc. Each of the interrupts (e.g., T.0, T.1, T.2, and T.n) is inserted into pre-load code 420 at a point which is equal to or less than a cache line of the cache device to which pre-load is being written. Thus, for a given portion of pre-load code 420 the size of (T.x+1-T.x) is equal or less than the cache line size of the cache memory to which pre-load code 420 is being written. Furthermore, in embodiments of the present invention, the size of pre-load code 420 (T.n-T.0) does not exceed the capacity of the cache memory to which it is being written.

Figure 5:
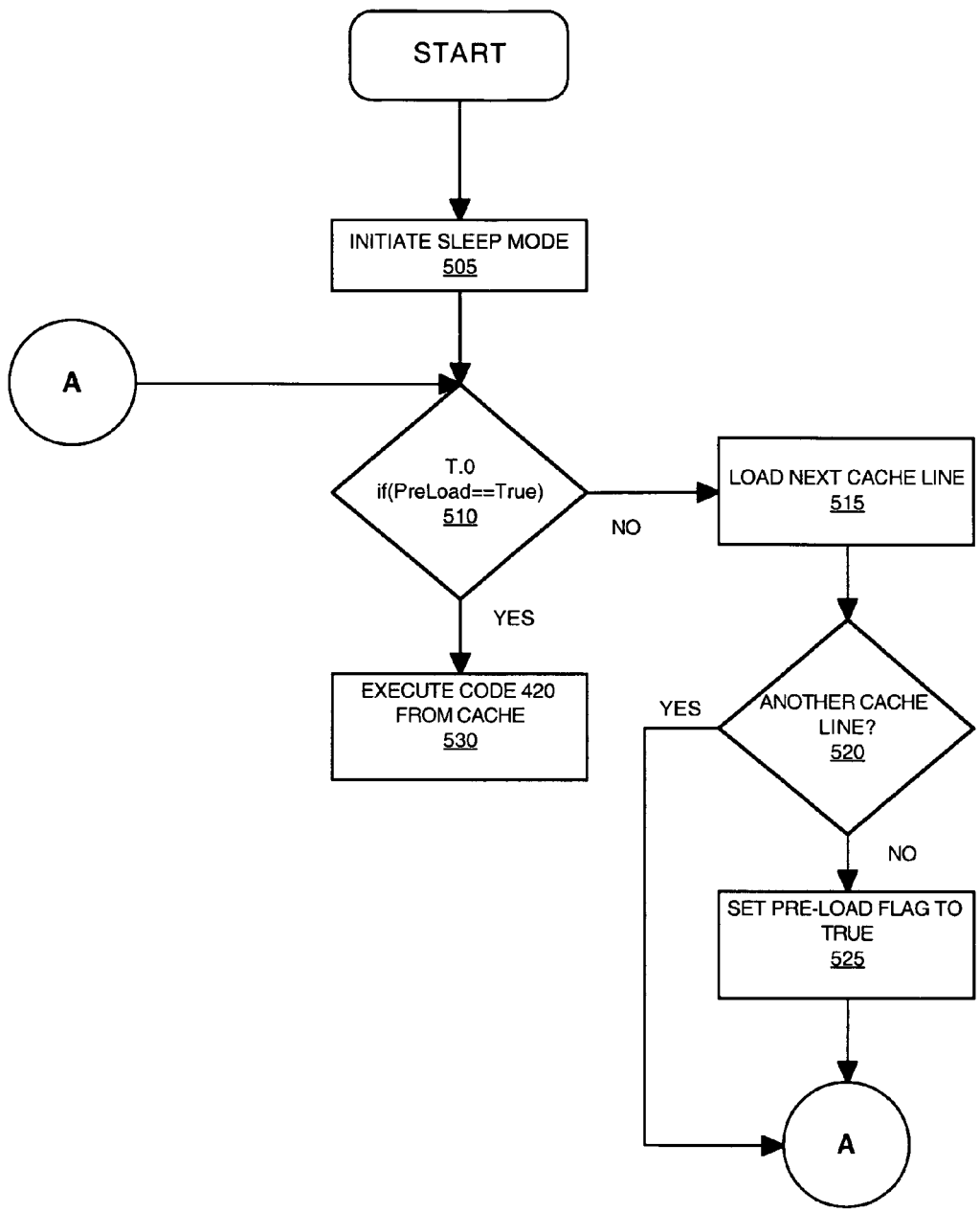
FIG. 5 is a flowchart of an exemplary sequence for pre-loading instructions in accordance with embodiments of the present invention.

FIG. 5 is a flowchart of an exemplary sequence 500 for pre-loading code 420 in accordance with embodiments of the present invention. As described above, in embodiments of the present invention the pre-load code (e.g., 420) is not loaded into cache memory until the sleep state is initiated for the device. Until this occurs, the pre-load flag is set to false. In step 505, an indication is received to place the electronic device in a sleep state.

In step 510, a logical operation is performed to determine if the pre-load code has been written to cache memory. In other words, the pre-load flag is checked. If the pre-load flag is false, indicating that the pre-load code has not been loaded into cache memory and sequence 500 proceeds to step 515. If the pre-load flag is true, sequence 500 proceeds to step 530.

In step 515, the next cache line is loaded. In embodiments of the present invention, pre-load code 420 is accessed (e.g., from memory 103) and loaded into cache memory (e.g., 211) as described above. After a cache line is written, sequence 500 proceeds to step 520.

In step 520, a logical operation is performed to determine whether another line of pre-load code 420 remains to be loaded into cache. If there is another line of pre-load code 420 which should be loaded into cache, sequence 500 proceeds to step 510. If there is no additional coding to be loaded into cache, sequence 500 proceeds to step 525.

In step 525, the pre-load flag is set to true. This indicates that the loading of pre-load code 420 into cache memory has been completed and execution of the coding may begin. After the pre-load flag has been set to true, sequence 500 proceeds to step 510. As described above, a logical operation is performed to determine if the pre-load code has been written to cache memory. Because the pre-load flag is now set to true, sequence 500 proceeds to step 530.

In step 530, the pre-load code 420 is executed from cache. An example of executing pre-load code 420 from cache in accordance with embodiments of the present invention is discussed in greater detail below with reference to FIG. 6.

FIG. 6 is a flowchart of executing pre-loaded code 420 from cache in accordance with embodiments of the present invention. In step 605, the current register settings for the memory controller are saved. As described above with reference to FIG. 3 and FIG. 4, in embodiments of the present invention, the current register settings (e.g., 410 of FIG. 4) for memory controller 201 are saved. In embodiments of the present invention, current settings 410 are saved to cache (e.g., L1 cache 210, L2 cache 211), or to memory 103, or to another data storage area.

In step 610, new memory controller settings for sleep mode are loaded from cache into registers. As described above with reference to FIG. 3 and FIG. 4, pre-load coding 420 comprises sleep mode data configuration 421. In embodiments of the present invention, sleep mode data configuration 421 comprises register settings for memory controller 201 which are loaded prior to initiating a sleep state for electronic device 100.

In step 615, a sleep state is initiated from an instruction stored in cache. As described above with reference to FIG. 3 and FIG. 4, pre-load coding 420 also comprises Sx command 422. In embodiments of the present invention, Sx command 422 is a sleep state command which is substantially compliant with the ACPI specification. While the present invention specifically recites that pre-load coding 420 comprises a data configuration for memory controller registers and an ACPI compliant sleep state command, it is noted that embodiments of the present invention may be used to pre-load other types of code into cache when, for example, memory 103 may not be available. At this point, main memory may not be accessible and memory is being self refreshed.

In step 620, an indication (e.g., an interrupt) is received to exit sleep state. In embodiments of the present invention, exiting from the sleep state can be initiated by, for example, a user moving a mouse or pressing a key on alpha-numeric input 107. Typically, this generates an interrupt signal which causes the ACPI chipset to "wake" the device, at which time the operating system of the electronic device resumes control.

In step 625, the prior register settings saved in step 605 are obtained from cache and loaded into registers of the memory controller. In embodiments of the present invention, when the operating system of electronic device 100 resumes control, it recovers the previously saved register settings (e.g., current settings 410 of FIG. 4) for memory controller 201. For example, these settings may be recovered from L2 cache 211.

In step 630, normal operation of the electronic device is resumed. After the register settings (e.g., current settings 410 of FIG. 4) for memory controller 210 have been restored, normal operation of electronic device 100 can resume because memory 103 can again be accessed via memory controller 201.

The preferred embodiment of the present invention, method and system for pre-loading and executing instructions within the cache memory, is thus described. While the present invention has been described in particular embodiments, it should be appreciated that the present invention should not be construed as limited by such embodiments, but rather construed according to the following claims.

What is claimed is:

1. A computer implemented system comprising:
    a memory device;
    a memory controller comprising registers;
    a cache memory; and
    a processor for implementing operations for operating in a reduced power state, said operations comprising:
    a) in response to an indication to enter said reduced power state, preloading instructions into a cache memory;
    b) executing said instruction from said cache memory, said instructions performing:
        b1) saving a state of said registers to cache memory;
        b2) programming said registers to implement self refresh of said memory device; and
        b3) issuing a first command to enter said reduced power state.

2. A system as described in claim 1 wherein said reduced power state is a sleep mode.

3. A system as described in claim 1 wherein said reduced power state is a standby mode.

4. A system as described in claim 1 wherein said preloading is not performed if said instructions are already loaded in said cache memory.

5. A system as described in claim 4 further comprising an instruction preload flag indicating the preload status of said instructions in said cache memory.

6. A system as described in claim 1 wherein said instructions are further for performing:
    b4) in response to a signal for exiting said reduced power state, restoring said registers of said memory controller to said saved state; and
    b5) issuing a second command to exit said reduced power state and to enter a normal operational state.

7. The system as described in claim 1 wherein said instructions are configured such that the cache line size of said cache memory is not exceeded.

8. The system as described in claim 1 wherein said command comprises an advanced configuration and power interface (ACPI) command.

9. A method for entering a power conservation state of an electronic device, said method comprising:
    receiving an indication to operate an electronic device in a reduced power consumption state;
    loading at least one instance of code into a cache memory in response to said indication, said at least one instance of code for causing said electronic device to enter said reduced power consumption;
    accessing and executing said at least one instance of code from said cache memory,
    wherein said executing said at least one instance of code comprises saving a state of a plurality of registers of said electronic device to said cache memory.

10. The method as recited in claim 9 wherein said executing said at least one instance of code further comprises:
    saving a current memory controller setting into said cache memory.

11. The method as recited in claim 9 wherein said executing said at least one instance of code further comprises:
    loading a new memory controller setting into said cache memory.

12. The method as recited in claim 9 wherein said executing said at least one instance of code further comprises:
    sending a sleep state command to an advanced configuration and power interface (ACPI) controller.

13. The method as recited in claim 9 wherein said executing at least one instance of code further comprises:
    executing a first command for causing said electronic device to terminate operating in sleep state; and
    executing a second command for restoring a prior configuration of said memory controller.

14. The method as recited in claim 9 further comprising:
    configuring said at least one instance of code wherein the cache line size of said cache memory is not exceeded.

15. The method as recited in claim 9, wherein said executing said at least one instance of code further comprises programming said registers to implement self refresh of said electronic device.

16. The method as recited in claim 9, wherein said executing said at least one instance of code further comprises issuing a first command to enter into said reduced power state.

17. A computer usable medium having computer readable program code embodied therein for causing a computer system to perform a method for pre-loading and executing code within the cache, said method comprising:
receiving an indication to operate an electronic device in a reduced power consumption state;
loading at least one instance of code into a cache memory in response to said indication, said at least one instance of code for causing said electronic device to enter said reduced power consumption;
accessing and executing said at least one instance of code from said cache memory,
wherein said executing said at least one instance of code comprises saving a state of a plurality of registers of said electronic device to said cache memory.

18. The computer usable medium of claim 17 wherein said executing said at least one instance of code further comprises:
saving a current memory controller setting into said cache memory.

19. The computer usable medium of claim 17 wherein said executing said at least one instance of code further comprises:
loading a new memory controller setting into said cache memory.

20. The computer usable medium of claim 17 wherein said executing said at least one instance of code further comprises:
sending a sleep state command to an advanced configuration and power interface (ACPI) controller.

21. The computer usable medium of claim 17 wherein said executing at least one instance of code further comprises:
executing a first command for causing said electronic device to terminate operating in sleep state; and
executing a second command for restoring a prior configuration of said memory controller.

22. The computer usable medium of claim 18 wherein said at least one instance of code further comprises:
configuring said at least one instance of code wherein the cache line size of said cache memory is not exceeded.

23. The method as recited in claim 17, wherein, said executing said at least one instance of code further comprises programming said registers to implement self refresh of said electronic device.

24. The method as recited in claim 17, wherein, said executing said at least one instance of code further comprises issuing a first command to enter into said reduced power state.

* * * * *